US007721265B1

United States Patent
Xu et al.

(10) Patent No.: US 7,721,265 B1
(45) Date of Patent: May 18, 2010

(54) SOURCE CODE DEBUGGING METHOD AND APPARATUS FOR USE IN SCRIPT TESTING ENVIRONMENT

(75) Inventors: Jun Xu, Cupertino, CA (US); Christopher H. Pham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1221 days.

(21) Appl. No.: 10/817,466

(22) Filed: Apr. 2, 2004

Related U.S. Application Data

(60) Provisional application No. 60/518,730, filed on Nov. 10, 2003.

(51) Int. Cl.
*G06F 9/44* (2006.01)
*G06F 11/00* (2006.01)

(52) U.S. Cl. .......................... 717/127; 714/31; 714/46; 719/320

(58) Field of Classification Search ........................ None
See application file for complete search history.

(56) References Cited

U.S. PATENT DOCUMENTS

| | | | | |
|---|---|---|---|---|
| 5,533,192 A * | 7/1996 | Hawley et al. | ................. | 714/28 |
| 5,903,718 A | 5/1999 | Marik | .......................... | 714/38 |
| 6,128,759 A | 10/2000 | Hansen | ....................... | 714/738 |
| 6,161,216 A * | 12/2000 | Shagam | ....................... | 717/128 |
| 6,249,882 B1 | 6/2001 | Testardi | ........................ | 714/38 |
| 6,263,456 B1 | 7/2001 | Boxall et al. | ................... | 714/31 |
| 6,263,457 B1 | 7/2001 | Anderson et al. | .............. | 714/38 |
| 6,357,019 B1 * | 3/2002 | Blaisdell et al. | ............... | 714/38 |
| 6,421,793 B1 | 7/2002 | Lester et al. | ................... | 714/37 |
| 7,010,782 B2 * | 3/2006 | Narayan et al. | ............. | 717/124 |
| 7,117,411 B2 * | 10/2006 | McNeely et al. | ............ | 714/724 |
| 7,296,187 B1 * | 11/2007 | Fritz et al. | ..................... | 714/31 |
| 7,385,927 B2 * | 6/2008 | Gygi et al. | ................... | 370/242 |
| 2003/0074650 A1 * | 4/2003 | Akgul et al. | ................. | 717/129 |

OTHER PUBLICATIONS

"Microsoft Visual InterDev 6.0 Debugging," (Visual InterDev Technical Articles) MicroSoft Corporation, Jan. 2002; 32 pages; http://msdn.microsoft.com/library/en-us/dnvid/html.

* cited by examiner

*Primary Examiner*—Michael J Yigdall
(74) *Attorney, Agent, or Firm*—Campbell Stephenson LLP

(57) ABSTRACT

Systems, methods, apparatus and software can be implemented to provide a debugger agent, either separate form or integrated into the script-based testing platform, to coordinate the selection, activation, and or/operation of debuggers suitable for a particular unit and program under test. Such a debugger agent can provide run time monitoring and debugging activities where previously not possible. The debugger agent is generally independent agent, in that it can work with a variety of types of test scripts, test script handlers, programming languages, and debuggers without customization. Moreover, implementation generally needs no code instrumentation.

37 Claims, 4 Drawing Sheets

SOURCE CODE DEBUGGING METHOD AND APPARATUS FOR USE IN SCRIPT TESTING ENVIRONMENT

This application claims the benefit, under 35 U.S.C. §119 (e), of U.S. Provisional Application No. 60/518,730, filed Nov. 10, 2003, entitled "Source Code Debugging Method and Apparatus for use in Script Testing Environment," and naming Jun Xu and Christopher Pham as inventors. The above-referenced application is hereby incorporated by reference herein in its entirety.

FIELD OF THE INVENTION

The present invention relates to automated testing of hardware and software, and particularly the use of debuggers in script driven systems for automated testing of hardware and software.

BACKGROUND OF THE INVENTION

Many automated systems and techniques exist for stimulus/response testing of various different types of devices (so called units under test (UUT)). Examples of such units under test include printed circuit-boards, line cards, network switches, switch-routers, routers, router-switches and storage network devices, computer networks, and other electronic systems and devices. In general, such testing involves supplying test input stimuli, e.g., commands, data, etc., to the unit under test, observing actual outputs e.g., actions, data, etc., generated by the unit under test in response to the stimuli, and possibly comparing the actual outputs to outputs that are expected if the unit under test is functioning properly. Depending upon the degree to which the actual outputs match those that are expected, the testing system can indicate either that the unit under test has passed the test, has failed the test, or is operating in an undetermined state.

In many such systems, the underlying operation of the unit under test is controlled by device software such as an operating system. For example, many line cards, network switches, switch-routers, routers, router-switches and storage network devices produced by Cisco Systems, Inc., operate using Cisco IOS software. Cisco IOS software is system software that provides common functionality, scalability, and security for a variety of devices, and allows centralized, integrated, and automated installation and management of internetworks while ensuring support for a wide variety of protocols, media, services, and platforms. Testing devices that run the such software (so called "programs under test") often requires sending the devices numerous commands as if the device was being used in normal operation. Such testing is often automated, or at least partially automated using a test script handler.

In the simplest example, a test script handler executes a test script and provides the stimuli generated by the test script, e.g., one or more commands, to the unit under test. More sophisticated test script handlers can be configured to: control a variety of units under test; execute and/or pass commands from a variety of different test scripts; schedule testing operations; and report results of various test operations. FIG. 1 illustrates a prior art script based automated test system. Test system 100 includes various computer systems such as server 105 and workstations 110 and 115 which are used to develop and/or host tests for various UUTs 160, 170, and 180. For example, a test engineer might use workstation 110 to develop and host a test script designed to test various features of software executing on UUT 160. Computer systems 105, 110, and 115 are typically coupled to a test server 130 through a network such as a LAN or WAN (as shown) or directly, so that they can host tests or at least provide test scripts to test server 130 and receive test information back from test server 130.

As shown, test server 130 includes a test script handler 135 that acts as a middle agent between test hosts and the units under test. In some cases, test script handler 135 merely acts to pass test commands from computer systems 105, 110, and 115 to the units under test, and returns corresponding information about test results. In other implementations, test script handler 135 can receive test scripts (140) from various test hosts and handle the execution of those test scripts on one or more units under test. Thus, test script handler 135 generally acts to direct the traffic between UUTs and test hosts. Test script handler 135 can also coordinate the loading, initialization, and activation of software (145) to be executed on the various UUTs. Such software can be thought of as the programs under test on the UUTs. The commands from the various test scripts are designed to use the programs under test in order to fully evaluate the functionality of the UUTs, as is well known in the art. Test script handler 135 can utilize other information such as test reports 150, initialization information for the UUT software (not shown) and the like. Thus, test system 100 allows a variety of different potential users the ability to test various different devices in a controlled, efficient manner.

Since test scripts are typically designed only to provide a series of commands to the unit under test, neither the test script handlers nor the test scripts themselves implement sophisticated debugging software, such as debuggers. Debuggers are designed to assist software and test engineers in the process of tracking down errors in the operation of software and/or hardware under test. While there are many tools available to debug a program under test or the test script, there are none designed to invoke a debugger when a bug-free test script triggers a failure in a unit under test's program and to thereby allow a developer to perform familiar run-time program debugging.

In addition, many different types of scripts can target the same unit under test. For example, in a multi-host testing system, some scripts may be written in, for example, Perl, Tcl/Tk, or Expect operating on a Unix platform, while other scripts are written in other script languages in other platforms such as Windows. The program under test itself may be written in different languages such as C, C++, etc, and the unit under test may be using one or more of a variety of different processor architectures, e.g., MIPS, ARM, Intel x86, PowerPC, etc. Under such circumstances, generic source code level program debugging mechanisms would be useful for scalability to serve a large range of development and testing platforms.

Consequently, there is a need for a mechanism to facilitate application program source code debugging when application failures are triggered by test scripts.

SUMMARY OF THE INVENTION

It has been discovered that systems, methods, apparatus and software can be implemented to provide a debugger agent, either separate form or integrated into the script-based testing platform, to coordinate the selection, activation, and or/operation of debuggers suitable for a particular unit and program under test. Such a debugger agent can provide run time monitoring and debugging activities where previously not possible. The debugger agent is generally independent agent, in that it can work with a variety of types of test scripts, test script handlers, programming languages, and debuggers without customization. Moreover, implementation generally needs no code instrumentation.

Accordingly, one aspect of the present invention provides a method. A debugger suitable for a unit under test is provided. The unit under test includes a program under test. The debugger is caused to be loaded into the unit under test. A plurality of test commands are sent to the unit under test according to a test script. The debugger is activated when a watched event occurs during execution of the program under test.

In another aspect of the present invention, a system includes a memory, a processor coupled to the memory, and a debugger agent. At least a portion of the debugger agent is encoded as instructions stored in the memory and executable on the processor. The debugger agent is configured to select a debugger program suitable for a unit under test, wherein the unit under test includes a program under test; cause the debugger program to be loaded into the unit under test; send a plurality of test commands to the unit under test according to a test script; and activate the debugger program when a watched event occurs during execution of the program under test.

In another aspect of the present invention, a computer readable medium includes program instructions executable on a processor. The computer readable medium is at least one of an electronic storage medium, a magnetic storage medium, an optical storage medium, and a communications medium conveying signals encoding the instructions. The program instructions are operable to implement each of: providing a debugger suitable for a unit under test, wherein the unit under test includes a program under test; causing the debugger to be loaded into the unit under test; sending a plurality of test commands to the unit under test according to a test script; and activating the debugger when a watched event occurs during execution of the program under test.

Yet another aspect of the present invention provides an apparatus including: a means for causing a means for debugging a program under test to be loaded into a unit under test, wherein the unit under test includes the program under test; a means for sending a plurality of test commands to the unit under test according to a test script; and a means for activating the means for debugging when a watched event occurs during execution of the program under test.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1:
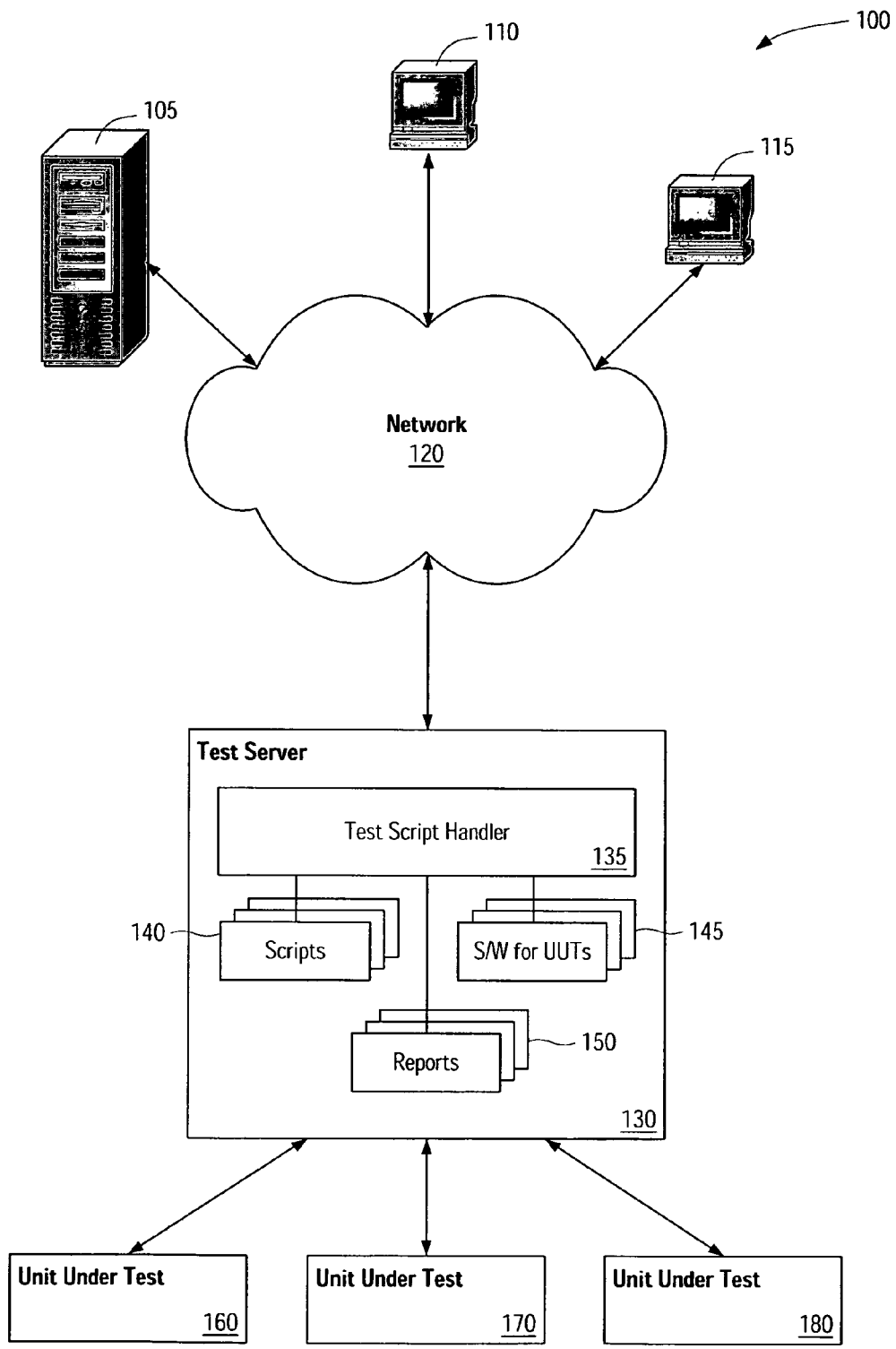
FIG. 1 is a simplified block diagram of a prior art script based automated test system.

The following sets forth a detailed description of at least the best contemplated mode for carrying out the one or more devices and/or processes described herein. The description is intended to be illustrative and should not be taken to be limiting.

Although a variety of different debuggers are well known in the art, this application will make reference to the GNU project debugger (GDB). This reference is made in part because GDB is widely used, it is used in both Unix/Linux and Windows environments, and it is available for use with a variety of different programming languages and processor architectures. Further details about GDB can be found at http://www.gnu.org/directory/devel/debuq/gdb.html and in the associated document Debugging with gdb, Ninth Edition, for gdb version 20031107, which is incorporated by reference herein in its entirety. Such references to GDB are merely for illustrative purposes, and those having ordinary skill in the art will readily recognize that a variety of different debuggers can be used in conjunction with the systems, methods, devices, and software disclosed in the present application.

In general, a debugger is a program designed to control other programs, sometimes referred to as targets, in order to enable programmers and test engineers to understand, control, and isolate defects in the target programs. Debuggers can control the execution of a program under scrutiny by using various types of watched events (e.g., a breakpoint) and instruction-level single stepping. A breakpoint is typically a special code placed in the executing code stream that, when executed, causes the processor executing the code to pause or invoke a trap mechanism. Such events are typically followed by informing the debugger so that it can be used to further analyze the state of the now suspended program. Execution of the program can also be suspended by the occurrence of an exception condition, i.e., some event such as an illegal operation that causes the processor to suspend activity and, typically, report the occurrence.

For example, the GDB debugger allows a user to define a variety of different events to be watched. A breakpoint in GDB makes a program stop whenever a certain point in the program is reached. For each breakpoint, one can add conditions to control in finer detail whether the program stops. Breakpoints can be set with break command and its variants to specify the place where the program should stop by line number, function name or exact address in the program. A watchpoint in GDB is a special breakpoint that stops a program when the value of an expression changes. Watchpoints can be managed like other breakpoints: one can enable, disable, and delete them using the same commands. Values from a program can be displayed automatically whenever GDB stops at a breakpoint. A catchpoint in GDB is another special breakpoint that stops a program when a certain kind of event occurs, such as the throwing of a C++ exception or the loading of a library: As is well known in the art, debuggers provide numerous mechanisms for controlling and monitoring operation of a target program.

In order to debug a program effectively, the debugger typically needs compile-time information about the program. This debugging information, usually referred to as a symbol file or table, is typically stored in an object file (or in some cases the executable itself) created at compile time. It describes, for example, the data type of each variable or function and the correspondence between source code line numbers and addresses in the executable code.

Once stopped, is possible to examine the state of a program, which includes the current stack trace (al list of all the functions/procedures called, and the order in which they were called), the values of hardware registers, the contents of memory accessible to the program, and other state information pertinent to the debugging process.

To take full advantage of debugger functionality, test system 200 uses a debugger agent 238 to coordinate the loading, initializing, and monitoring of debuggers on various UUTs, as well as to manage any needed interaction between the debuggers and the test script handler 235. In the example shown in FIG. 2, debugger agent 238 is part of test server 230. Debugger agent 238 also has access to one or more debugging programs (debuggers 236) designed for specific hardware platforms, e.g., for UUTs using specific processors. For example, if unit under test 170 utilizes a MIPS processor, the debugger to be used with UUT 170 may have to be designed for the MIPS platform. Thus, for added flexibility, debugger agent 238 can be designed to operate with many different UUT platforms and similarly utilize correspondingly different debuggers. Since, in this example, test script handler 235 coordinates the loading and initialization of the UUT software, i.e., the programs under test, symbol files 237 can also be included for use by various debuggers 236. In general, there will be at least one symbol file for each program 145 to be executed and tested on a UUT.

Here, test script handler 235 is designed to interoperate with debugger agent 238. As previously noted, test script handler 235 serves to manage the execution of test script commands on various UUTs and to coordinate the flow of information between test hosts and UUTs. Test script handler 235 is typically designed to support unattended testing of software and hardware products. It can facilitate repetitive regression testing during off-hours when testbeds are not being used for manual testing, and provide test engineers more time to perform tasks that are difficult to automate. Test script handler 235 typically schedules test runs and generates report files. In some implementations, a separate test script handler program is used for each test system installed.

Test script handler 235 can perform a variety of different functions. For example, before a test starts and/or while a test is in progress, test script handler 235 can search for optional files that are used to control various aspects of a test, including which tests to run, who should receive emailed test results, and when to terminate a test. Before a first test script is executed, test script handler 235 typically runs a "clean-up" script to initialize the testing environment to a known state. The clean-up script removes, for example, any residual configurations left from a previous test or some prior usage. Test script handler 235 can also log messages describing its actions and maintain an ongoing summary of the testing. In still another example, after a test run is completed, test script handler 235 prepares a report summarizing the test and including any useful final results.

Figure 2:
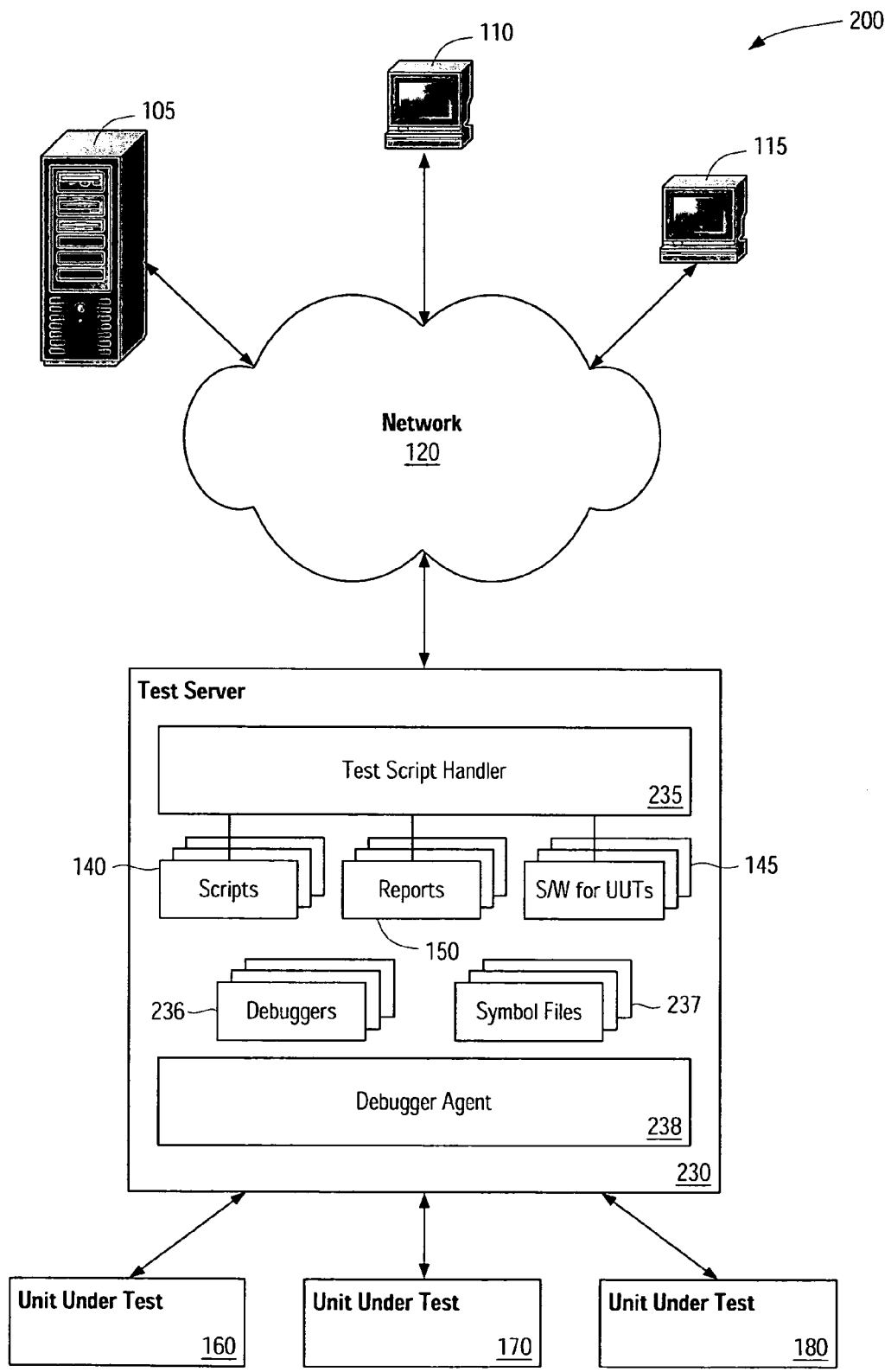
FIG. 2 is a simplified block diagram of an automated test system including some of the systems and methods of the present invention.

Although FIG. 2 illustrates one of the more complex testing environment architectures where a debugger agent can be implemented, numerous variations can be implemented. In one example, one or more of debugger agent 238, debuggers 236, and symbol files 237, can exist on and/or be implemented on a computer system separate from test server 230. In such an example, this additional computer system might be a debugger server that interoperates with test server 230, computer systems 105-115, and/or UUTs 160-170. In another example not illustrated, a test host, the debugger agent, and any associate files operate on a single computer system without the use of a test script handler. In this example, the test script execution is scheduled by the operating system present in the test host. Such a system can be coupled to multiple UUTs, but typically operates with only one UUT at a time. In still another example not illustrated, an even simpler implementation operates on the unit under test itself. The program under test executes on the same computer hosting the test scripts and the debugger agent. This configuration is common for developers who develop applications or hardware drivers for the same machine, then launch a test script (or batch file) to test the software. Still other arrangements and configurations will be known to those having ordinary skill in the art.

Returning to the general operation of test system 200, upon execution of debugger agent 238, the debugger agent issues the necessary system commands to retrieve the processor specific debugger 236, e.g., from test server 230 or from another server, based on the processor type of the unit under test. The corresponding binary and symbol files are also loaded for that software to be executed on the unit under test. Since there are multiple UUTs, similar procedures can be performed for each one. In advance of execution of the debugger agent, or while it is being executed, an operator can specify any additional parameters such as debugging parameters (break points, exceptions to ignore, watched events, etc.), reporting preferences, and the like. The debugger is typically invoked in a stand-by or disabled mode so that it does not operate unless or until there is an exception on the unit under test, thereby reducing the performance impact. Test system performance is minimally affected by introducing the debugger agent which acts as the middle agent between the test scripts and the program under test. For most complex systems, this is performance impact is similar to that of the script scheduler, which contributes to the overall testing time, but not the application execution time. When the debugger needs to be turned on, a flag can be set to change the unit under test into the debug monitoring mode. Similarly, once a debugger is activated, a pending test script may be suspended either at the direction of the debugger agent or by the test script handler itself.

For example, when the debug monitoring mode is active, the process will run in the background to monitor the exception from the UUT. When a certain script triggers a failure on the UUT, the exception is caught. The debugger agent suspends the operation and places the UUT into the debug mode. A variety of debugging information can then be logged or provided to a user. After debugging the application from the unit under test side, the debugger agent can allow the test script to continue the execution from the suspended location.

When a UUT such as a router crashes, the router can switch to a debugger prompt immediately after encountering the exception. At that time, the debugger agent and/or the test script handler will collect the debugger stack trace information. In another example, it is sometimes difficult and costly to replicate a bug if the test is being performed in hardware or a topology different from a previously reported bug. Using the debugger agent and the associated debugger, router driven test scripts can be stopped to a debugging mode (operated by the debugger) when the crash happens (after exceptions) or before the point a crash occurs, e.g., using a break point. With the test script suspended, the router can be handled by developers for further debugging using the debugger and familiar debugging techniques. If desired, the agent can also use the debugger to provide information such as variables values in each frame to facilitate any debugging.

Figure 3:
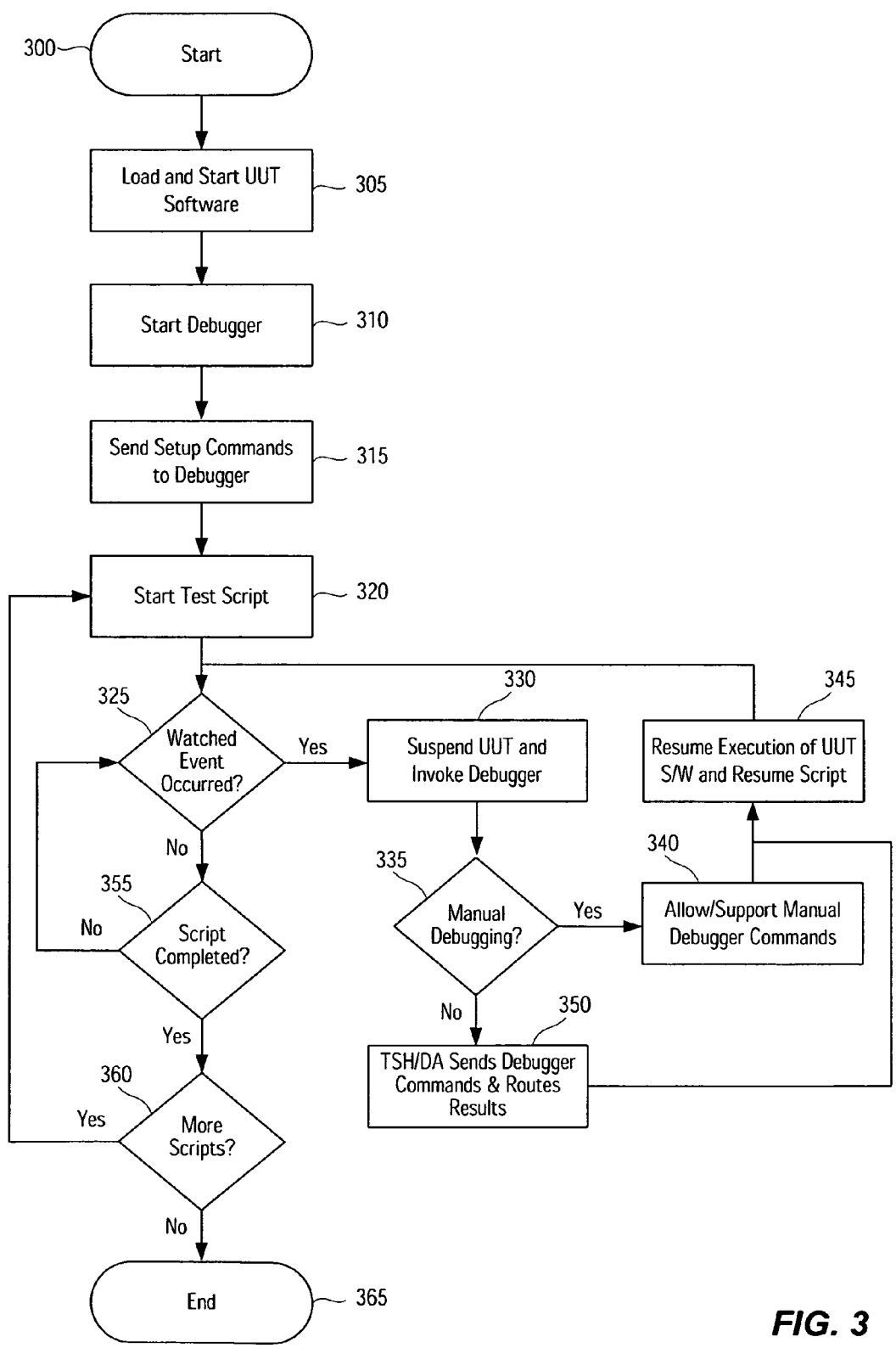
FIG. 3 is a flow chart illustrating techniques of the present invention.

FIG. 3 illustrates in greater detail one example of the operation of a test system like that shown in FIG. 2. Operation of the system begins at 300 where, for example, a test host submits a test script to a test handler, a test host initiates the process directly, or a test host instructs a test handler to prepare for execution of a particular test script.

The test host will typically specify either the specific UUT to use or a type of UUT to be used (where there is a test bed of multiple UUTs). With that information, a test handler or a test host itself will load (or cause to be loaded) and start the UUT software (305). This process can include providing additional configuration instructions to the UUT and it software under test, such as initialization instructions, pause instructions, etc. In step 310, an appropriate debugger is started. This process can include selecting the proper kind of debugger, e.g., a platform-specific debugger, loading the debugger (or causing the debugger to be loaded) into the UUT, and starting the debugger. Depending on the specifics of the UUT, the program under test, and the type of debugger in use, the loading/starting process may unfold in a number of different ways. For example, where the debugger is GDB, operations 305 and 310 can be performed approximately simultaneously by invoking the debugger with a specific argument, e.g., the name of the executable, in a way that also starts the program under test. In still other examples, the debugger can be instructed to attach itself to one or more existing processes on the UUT by specifying a process identifier and/or the name of the corresponding executable. Still other methods can be used to initiate debugger operation as will be known to those having ordinary skill in the art. Operation 310 will also typically include sub-operations such as symbol file loading.

In 315, the debugger is further configured to perform certain tasks as desired by the test engineer. For example, breakpoints, watchpoints, and catchpoints can be set. Other commands for controlling the debugging process can also be sent to the debugger. In some applications, it is not feasible for the debugger to interrupt the program's execution long enough for a test engineer to learn anything helpful about its behavior. If the program's correctness depends on its real-time behavior, delays introduced by a debugger might cause the program to change its behavior drastically, or perhaps fail, even when the code itself is correct. It is thus useful to be able to observe the program's behavior without interrupting it. Thus, debuggers such as GDB implement commands like trace and collect, where one can specify locations in the program, called tracepoints, and arbitrary expressions to evaluate when those tracepoints are reached. Later, using the other commands, one can examine the values those expressions had when the program hit the tracepoints. The expressions may also denote objects in memory structures or arrays, for example, whose values the debugger should record. While visiting a particular tracepoint, one can inspect those objects as if they were in memory at that moment. However, because the debugger records these values without interacting with the user, it can do so quickly and unobtrusively, hopefully not disturbing the program's behavior.

Additionally, either as part of step 315, or one of the preceding steps, more general configuration information can be specified. As will be seen below, the system can be configured to allow for immediate user access to the debugger when an exception occurs, or to record relevant information and pass that information along to a user. Such test script handler and/or debugger operation is usually configured in advance of the execution of a test script (320). Once the test script is started, a test host and/or a test handler submit various commands to the UUT according to the test script.

Watched events are monitored by the debugger in 325. A watched event can be any event for which the debugger can be configured to respond, e.g., processor errors/exceptions, interrupts, breakpoints, watchpoints, catchpoints, etc. If a watched event occurs, as determined in 325, operation transitions to 330 where the UUT and/or the program under test are paused or suspended and the debugger is invoked. As noted above, there may be some types of watched events, e.g., arriving at a tracepoint, where operation of the UUT and the program under test are not suspended, but some information is recorded. However, if the type of event that warrants operation suspension has occurred, it is next determined whether they system is configured for manual debugging (335). With manual debugging enabled, the unit under test driven by the test script can be stopped to a debugger mode when an exception occurs. Control of the UUT can be handed over to developers for further debugging using debugger commands (340). If desired, a tester can also use the debugger to provide information such as the variable values, stack trace information, and stack frame information to facilitate any debugging. Once the manual debugging is complete, operation proceeds to 345 where execution of the program under test resumes (if possible) and test script execution continues as shown.

If the system is configured for automatic debugging, as determined in 335, a variety of debugger commands can be executed in an automated fashion (350). The commands would typically include commands to report various variable values, memory states, stack trace information, and the like. However, a variety of different debugger commands could be executed in this step. Thus, when a program under test in the UUT crashes, operation will switch to the debugger, and the debugger will be ready to receive commands. At that time, the debugger agent and/or the test script handler can collect the desired information, and provide it to a user in a convenient format, e.g., a log file, an e-mail message, etc. Upon completion of the automated debugging operations (350), operation transitions to 345 and ultimately to test script resumption as descried above.

If no watched event occurs (325) it is determined if the test script is complete (355). If not, operation returns to 325. If so, step 360 determines whether there are more test scripts to execute. If there are, operation transitions to 320, and if there are no more test scripts the process ends at 365.

As can be seen from the above description, the debugging agent provides a number of useful features. The debug agent is generally hardware and platform independent, and is thus quite scalable. After a debugger agent is implemented, there is typically no need for code instrumentation or extra test script development, so there is no impact on performance or behavior of the original code and preserve the original test setup. Runtime monitoring and debugging activities are provided for testing systems that previously had little or no debugging support. Debugging is further automated because commands are issued automatically by the debugger agent to instruct the debugger to report defect debugging information. Many different script languages, programming languages, and debuggers can be used. In implementations where the debugger agent is independent of the test script handler, it can work with any script, script handler, programming languages or any debuggers without further customization. As noted above, code instrumentation is typically not required. For example, when source code is compiled with a debug option, the debugger should have enough information to present stack trace, variable values, etc., based on the information (symbol file) produced by the compiler.

In general, the techniques and modules described above can be scaled top operate in multiprocess/multiprocessor environments. For example, the debugging mechanism can be easily expanded to attach the debugger to each child process. For homogeneous environments, it is possible to use a shared library to attach the debugger to all processes. For the heterogeneous systems, in a remote debugging case such as the remote debugging supported by GDB, each process may need to be treated separately, and the algorithm illustrated in FIG. 1 can be expanded accordingly.

Thus, a mechanism to allow application source code debugging triggered by system level test scripts has been presented. It is worth the investment to add in a mechanism such as the DA to gain the controllability and observability at the source code level while compromising very low performance or code investment of the existing test setup. It provides the accessibility to application developers at the system level (which translates into field level), so it helps to reduce the service time, thus increase the system up time.

The flow chart of FIG. 3 and the systems, methods, and techniques described herein illustrate some of the many operational examples of debugger agent use disclosed in the present application. Those having ordinary skill in the art will readily recognize that certain steps or operations described or illustrated can be eliminated or taken in an alternate order. Moreover, the methods described and modules illustrated are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Figure 4:
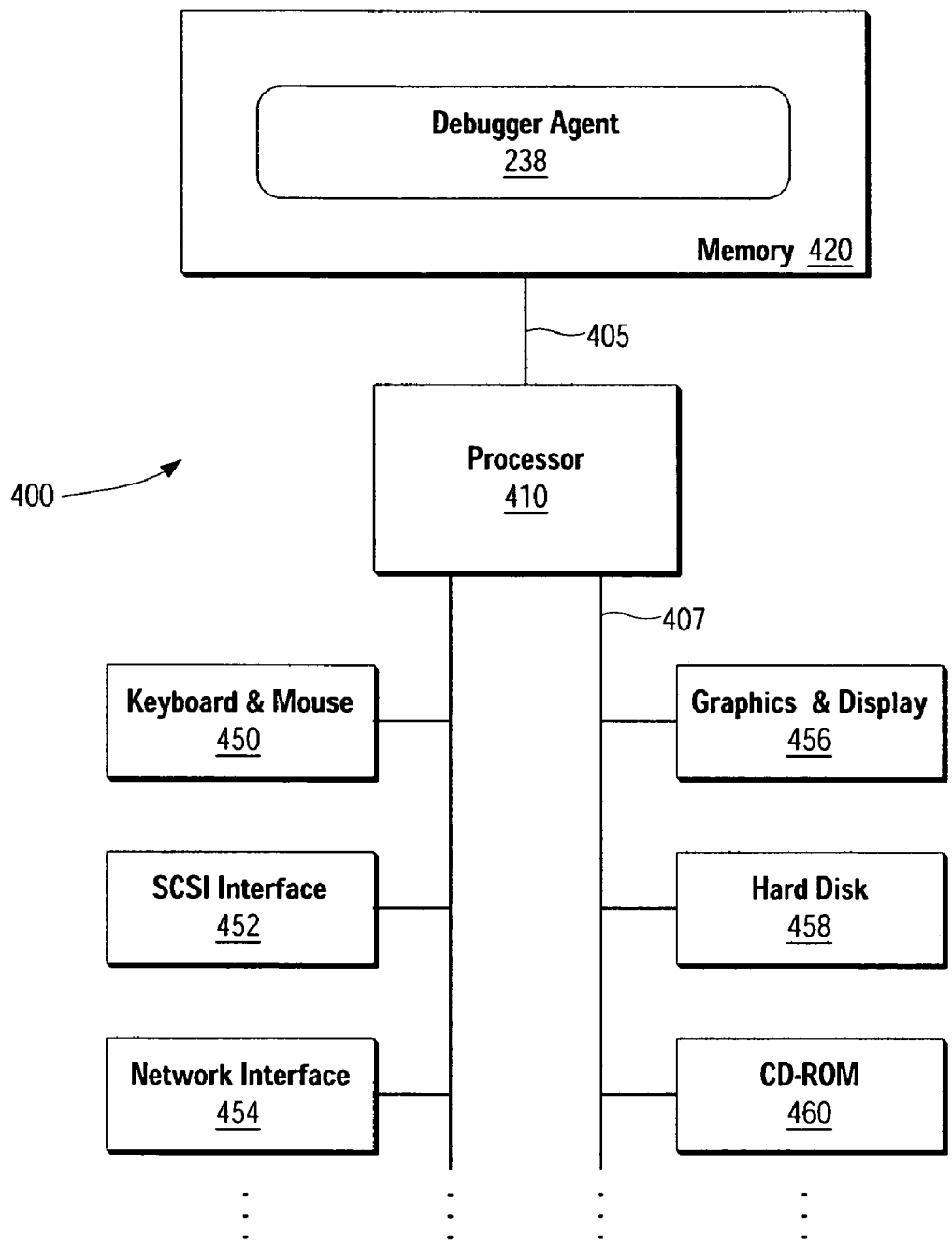
FIG. 4 is a block diagram of a computer system for implementing the techniques of the present invention.

FIG. 4 illustrates a block diagram of a computer system 400 for implementing the techniques for handling expandable storage of the present invention. For example, computer system 400 can be an embodiment of one of the previously described hosts. Computer system 400 includes a processor 410 and a memory 420 coupled together by communications bus 405. Processor 410 can be a single processor or a number of individual processors working together. Memory 420 is typically random access memory (RAM), or some other dynamic storage device, and is capable of storing instructions to be executed by the processor, e.g., debugger agent 238. Memory 420 is also used for storing temporary variables or other intermediate information during the execution of instructions by the processor 410.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Peri and Tcl/Tk. Additionally, software 230 and 262 can be provided to the computer system via a variety of computer readable media including electronic media (e.g., flash memory), magnetic storage media (e.g., hard disk 458, a floppy disk, etc.), optical storage media (e.g., CD-ROM 460), and communications media conveying signals encoding the instructions (e.g., via a network coupled to network interface 454).

Computer system 400 also includes devices such as keyboard & mouse 450, SCSI interface 452, network interface 454, graphics & display 456, hard disk 458, and CD-ROM 460, all of which are coupled to processor 410 by communications bus 407. It will be apparent to those having ordinary skill in the art that computer system 400 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
causing a debugger agent to select a debugger program wherein
the debugger agent is executed on a test server,
the debugger program is one of a plurality of debugger programs,
the debugger agent is configured to select the debugger program from the plurality of debugger programs,
each of the plurality of debugger programs is one of a plurality of platform-specific debugger programs,
each of the plurality of platform-specific debugger programs is compatible with at least one of a plurality of computing environments,
the debugger program is suitable for at least one device under test of a plurality of devices under test, by virtue of the debugger program being a platform-specific debugger program compatible with a computing environment of the at least one device under test, and
the at least one device under test is configured to execute a program under test; causing the debugger agent to download the debugger program from the test server to the at least one device under test;
configuring the debugger program to operate in a debugging mode, wherein
the debugging mode is one of
an automatic debugging mode, and
a manual debugging mode;
sending a plurality of test commands, wherein
the test commands are sent from the test server to the at least one device under test, and
the test commands are sent according to a test script: and
activating the debugger program when a watched event occurs during execution of the program under test, wherein
in response to the activating the debugger program, the debugger program is configured to
automatically execute at least one debugging command, if the debugger program is configured to operate in the automatic debugging mode, and
allow the at least one device under test to be controlled via the debugger agent, if the debugger program is configured to operate in the manual debugging mode, and
the at least one debugging command is configured to cause information regarding the execution of the program under test to be recorded.

2. The method of claim 1 further comprising:
determining if the debugger program is configured to operate in the automatic debugging mode; and
if the debugger program is operating in the automatic debugging mode, directing a debugger command to the debugger program; and
recording information provided by the debugger program according to the debugger command.

3. The method of claim 1 further comprising:
determining if the debugger program is configured to operate in the manual debugging mode; and
if the debugger is operating in the manual debugging mode, pausing execution of the program under test: and
allowing a user to control the debugger program.

4. The method of claim 1 further comprising:
invoking the debugger program while specifying the program under test as a target of the debugger program.

5. The method of claim 1 further comprising:
instructing the debugger program to associate itself with a process executing on the at least one device under test, wherein the process corresponds to the program under test.

6. The method of claim 1 further comprising:
sending a command to the debugger program, wherein the command performs at least one of:
setting a breakpoint in the program under test;
setting a watchpoint in the program under test;
setting a catchpoint in the program under test; and
setting a tracepoint in the program under test.

7. The method of claim 1 wherein the watched event comprises at least one of:
a processor exception;
a program under test error;
reaching a breakpoint in the program under test;
reaching a watchpoint in the program under test;
reaching a catchpoint in the program under test; and
reaching a tracepoint in the program under test.

8. The method of claim 1 further comprising:
loading, into the at least one device under test, a symbol file corresponding to the program under test.

9. The method of claim 1 further comprising:
causing the debugger agent to download a plurality of debugger programs from the test server into a plurality of devices under test.

10. A system comprising:
a memory;
a processor coupled to the memory; and
a debugger agent, wherein
at least a portion of the debugger agent is encoded as instructions stored in the memory and executable on the processor,
the debugger agent is configured to be executed on a test server, and
the debugger agent is configured to
select a debugger program, wherein
the debugger program is one of a plurality of debugger programs,
each of the plurality of debugger programs is one of a plurality of platform-specific debugger programs,
each of the plurality of platform-specific debugger programs is compatible with at least one of a plurality of computing environments,
the debugger program is suitable for at least one device under test of a plurality of devices under test, by virtue of the debugger program being a platform-specific debugger program compatible with a computing environment of the at least one device under test,
the at least one device under test is configured to execute a program under test, and
the debugger agent is further configured to select the debugger program from the plurality of debugger programs,
cause the debugger program to be downloaded from the test server to the at least one device under test,
configure the debugger program to operate in a debugging mode, wherein
the debugging mode is one of
an automatic debugging mode, and
a manual debugging mode;
send a plurality of test commands, wherein
the test commands are sent from the test server to the at least one device under test, and
the test commands are sent according to a test script, and
activate the debugger program when a watched event occurs during execution of the program under test, wherein
in response to the activating the debugger program, the debugger program is configured to
automatically execute at least one debugging command, if the debugger program is configured to operate in the automatic debugging mode, and
allow the at least one device under test to be controlled via the debugger agent, if the debugger program is configured to operate in the manual debugging mode, and
the at least one debugging command is configured to cause information regarding the execution of the program under test to be recorded.

11. The system of claim 10 further comprising at least one debugger program stored in at least one of the memory and a storage device accessible by the processor.

12. The system of claim 10 further comprising at least one symbol file stored in at least one of the memory and a storage device accessible by the processor.

13. The system of claim 10 further comprising:
a test script handler, wherein at least a portion of the test script handler is encoded as instructions stored in the memory and executable on the processor.

14. The system of claim 13 wherein the test script handler is further configured to send the plurality of test commands to the debugger agent.

15. The system of claim 10 further comprising:
a second memory;
a second processor coupled to the second memory; and
a test script handler, wherein at least a portion of the test script handler is encoded as instructions stored in the second memory and executable on the second processor.

16. The system of claim 15 wherein the test script handler is further configured to send the plurality of test commands to the debugger agent.

17. The system of claim 10 wherein the debugger agent is further configured to:
determine if the debugger program is configured to operate in the automatic debugging mode; and
if the debugger program is operating in the automatic debugging mode,
direct a debugger program command to the debugger program; and
record information provided by the debugger program according to the debugger command.

18. The system of claim 10 wherein the debugger agent is further configured to:
determine if the debugger program is configured to operate in the manual debugging mode; and
if the debugger is operating in the manual debugging mode, suspend execution of the program under test: and
allow a user to control the debugger program.

19. The system of claim 10 wherein the debugger agent is further configured to:
    invoke the debugger program while specifying the program under test as a target of the debugger program.

20. The system of claim 10 wherein the debugger agent is further configured to:
    command the debugger program to associate itself with a process executing on the at least one device under test, wherein the process corresponds to the program under test.

21. The system of claim 10 wherein the debugger agent is further configured to:
    send a command to the debugger program, wherein the command performs at least one of:
      setting a breakpoint in the program under test;
      setting a watchpoint in the program under test;
      setting a catchpoint in the program under test; and
      setting a tracepoint in the program under test.

22. The system of claim 10 wherein the watched event comprises at least one of a processor exception, a program under test error, reaching a breakpoint in the program under test, reaching a watchpoint in the program under test, reaching a catchpoint in the program under test, and reaching a tracepoint in the program under test.

23. The system of claim 10 wherein the debugger agent is further configured to:
    load, into the at least one device under test, a symbol file corresponding to the program under test.

24. A computer readable storage medium comprising program instructions executable on a processor, the computer readable storage medium encoding the program instructions, wherein the program instructions are configured to implement each of:
    causing a debugger agent to select a debugger program, wherein
      the debugger agent is configured to be executed on a test server,
      the debugger program is one of a plurality of debugger programs,
      the debugger agent is configured to select the debugger program from the plurality of debugger programs,
      each of the plurality of debugger programs is one of a plurality of platform-specific debugger programs,
      each of the plurality of platform-specific debugger programs is compatible with at least one of a plurality of computing environments,
      the debugger program is suitable for at least one device under test of a plurality of devices under test, by virtue of the debugger program being a platform-specific debugger program compatible with a computing environment of the at least one device under test, and
      the at least one device under test is configured to execute a program under test;
    causing the debugger agent to download the debugger program into from the test server to the at least one device under test;
    configuring the debugger program to operate in a debugging mode, wherein
      the debugging mode is one of
        an automatic debugging mode, and
        a manual debugging mode;
    sending a plurality of test commands, wherein
      the test commands are sent from the test server to the at least one device under test, and
      the test commands are sent according to a test script; and
    activating the debugger program when a watched event occurs during execution of the program under test, wherein
      in response to the activating the debugger program, the debugger program is configured to
        automatically execute at least one debugging command, if the debugger program is configured to operate in the automatic debugging mode, and
        allow the at least one device under test to be controlled via the debugger agent, if the debugger program is configured to operate in the manual debugging mode, and
      the at least one debugging command is configured to cause information regarding the execution of the program under test to be recorded.

25. The computer readable storage medium of claim 24 further comprising program instructions operable to implement each of:
    determining if the debugger program is configured to operate in the automatic debugging mode; and
    if the debugger program is operating in the automatic debugging mode,
      directing a debugger command to the debugger program; and
      recording information provided by the debugger program according to the debugger command.

26. The computer readable storage medium of claim 24 further comprising program instructions operable to implement each of:
    determining if the debugger program is configured to operate in the manual debugging mode; and
    if the debugger is operating in the manual debugging mode,
      pausing execution of the program under test: and
      allowing a user to control the debugger program.

27. The computer readable storage medium of claim 24 further comprising program instructions operable to implement:
    invoking the debugger program while specifying the program under test as a target of the debugger program.

28. The computer readable storage medium of claim 24 further comprising program instructions operable to implement:
    instructing the debugger program to associate itself with a process executing on the at least one device under test, wherein the process corresponds to the program under test.

29. The computer readable storage medium of claim 24 further comprising program instructions operable to implement:
    sending a command to the debugger program, wherein the command performs at least one of:
      setting a breakpoint in the program under test;
      setting a watchpoint in the program under test;
      setting a catchpoint in the program under test; and
      setting a tracepoint in the program under test.

30. The computer readable storage medium of claim 24 wherein the watched event comprises at least one of a processor exception, a program under test error, reaching a breakpoint in the program under test, reaching a watchpoint in the program under test, reaching a catchpoint in the program under test, and reaching a tracepoint in the program under test.

31. The computer readable storage medium of claim 24 further comprising program instructions operable to implement:
    loading, into the at least one device under test, a symbol file corresponding to the program under test.

32. An apparatus comprising:
means for selecting a debugger program wherein
  the means for selecting is comprised in a test server,
  the debugger program is one of a plurality of debugger programs,
  the means for selecting is configured to select the debugger program from the plurality of debugger programs,
  each of the plurality of debugger programs is one of a plurality of platform-specific debugger programs,
  each of the plurality of platform-specific debugger programs is compatible with at least one of a plurality of computing environments,
  the debugger program is suitable for at least one device under test of a plurality of devices under test, by virtue of the debugger program being a platform-specific debugger program compatible with a computing environment of the at least one device under test;
means for causing the debugger program to be downloaded from the test server to the at least one device under test, wherein
  the at least one device under test is configured to execute a program under test:
means for configuring the debugger program to operate in a debugging mode, wherein
  the debugging mode is one of
    an automatic debugging mode, and
    a manual debugging mode;
means for sending a plurality of test commands, wherein
  the means for sending is configured to send the test commands from the test server to the at least one device under test, and
  the means for sending is further configured to send the test commands according to a test script; and
means for activating the debugger program when a watched event occurs during execution of the program under test, wherein
  responsive to the means for activating the debugger program, the debugger program is configured to
    automatically execute at least one debugging command, if the debugger program is configured to operate in the automatic debugging mode, and
    allow the at least one device under test to be controlled via the debugger agent, if the debugger program is configured to operate in the manual debugging mode, and
    the at least one debugging command is configured to cause information regarding the execution of the program under test to be recorded.

33. The apparatus of claim 32 further comprising:
a means for determining if the debugger program is configured to operate in the automatic debugging mode; and
if the debugger program is operating in the automatic debugging mode,
  a means for directing an instruction to the debugger program during execution of a program under test; and
  a means for recording information provided by the debugger program during execution of a program under test.

34. The apparatus of claim 32 further comprising:
a means for determining if the debugger program is configured to operate in the manual debugging mode; and
if the debugger is operating in the manual debugging mode,
  a means for pausing execution of the program under test: and
  a means for allowing a user to control the debugger program during execution of a program under test.

35. The apparatus of claim 32 further comprising:
a means for instructing the debugger program during execution of a program under test to associate itself with a process executing on the at least one device under test, wherein the process corresponds to the program under test.

36. The apparatus of claim 32 further comprising:
a means for sending a command to the debugger program during execution of a program under test, wherein the command performs at least one of:
  setting a breakpoint in the program under test;
  setting a watchpoint in the program under test;
  setting a catchpoint in the program under test; and
  setting a tracepoint in the program under test.

37. The apparatus of claim 32 wherein the watched event comprises at least one of a processor exception, a program under test error, reaching a breakpoint in the program under test, reaching a watchpoint in the program under test, reaching a catchpoint in the program under test, and reaching a tracepoint in the program under test.

* * * * *